(12) United States Patent
Skidmore (10) Patent No.: US 11,302,067 B2
(45) Date of Patent: Apr. 12, 2022

(54) SYSTEMS AND METHOD FOR REALISTIC AUGMENTED REALITY (AR) LIGHTING EFFECTS

(71) Applicant: EDX Technologies, Inc., Austin, TX (US)

(72) Inventor: Roger Ray Skidmore, Austin, TX (US)

(73) Assignee: EDX Technologies, Inc., Austin, TX (US)

(*) Notice: Subject to any disclaimer, the term of this patent is extended or adjusted under 35 U.S.C. 154(b) by 0 days.

(21) Appl. No.: 16/558,594

(22) Filed: Sep. 3, 2019

(65) Prior Publication Data

US 2020/0074725 A1 Mar. 5, 2020

Related U.S. Application Data

(60) Provisional application No. 62/725,383, filed on Aug. 31, 2018.

(51) Int. Cl.
*G06T 15/50* (2011.01)
*G06T 15/60* (2006.01)
*G06T 19/00* (2011.01)

(52) U.S. Cl.
CPC ............ *G06T 15/506* (2013.01); *G06T 15/60* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 8,405,680 B1 | 3/2013 | Cardoso Lopes et al. | |
| 8,872,853 B2 | 10/2014 | Sugden et al. | |
| 9,524,585 B2 | 12/2016 | Steed et al. | |
| 2008/0211813 A1* | 9/2008 | Jamwal | G01J 1/1626 345/426 |
| 2016/0210780 A1 | 7/2016 | Paulovich et al. | |
| 2017/0046877 A1 | 2/2017 | Hustad et al. | |
| 2017/0365102 A1* | 12/2017 | Huston | H04N 5/23238 |
| 2018/0089899 A1* | 3/2018 | Piemonte | G06T 15/205 |
| 2018/0182160 A1* | 6/2018 | Boulton | G06T 15/506 |
| 2019/0378341 A1* | 12/2019 | Xie | G06T 19/20 |

* cited by examiner

*Primary Examiner* — Yanna Wu
(74) *Attorney, Agent, or Firm* — WC&F IP (57) ABSTRACT

Realistic augmented reality (AR) augmentations are produced in reliance on a 3D virtual model modeled after a real world environment. Light and shadow parameters for the augmentations are produced not only from real world parameters such as, for example, a real present position of the actual sun, but also from virtual world parameters which characterize the virtual model or virtual objects within the virtual model.

11 Claims, 3 Drawing Sheets

SYSTEMS AND METHOD FOR REALISTIC AUGMENTED REALITY (AR) LIGHTING EFFECTS

CROSS-REFERENCE TO RELATED APPLICATIONS

This application or patent claims the benefit of U.S. Provisional Patent Application No. 62/725,383, filed Aug. 31, 2018, the complete contents of which are herein incorporated by reference.

FIELD OF THE INVENTION

The invention generally relates to augmented reality (AR), and, in particular, means for rendering augmentations with realistic visual lighting effects.

BACKGROUND

US 2008/0211813 A1 describes a device and method for light and shade simulation in an augmented-reality system. Its approach is of limited use owing to a preoccupation with strictly real world sensor inputs.

U.S. Pat. No. 8,405,680 B1 describes a procedure for combining a real image and a virtual image subject to occlusions and lighting determined from sensed depth data, for example. The procedure has limited effectiveness, using a virtual model of only a virtual object.

U.S. Pat. No. 9,524,585 B2 describes outputting an augmented reality image which is created by extensive processing of real object geometries. The procedure undesirably requires considerable real-time image processing and environment reconstruction.

U.S. Pat. No. 8,872,853 B2 describes a head-mounted display system which creates a graphical representation of an illuminated virtual object by collecting optical and position information about a physical environment and then creating a virtual environment to which an ambient lighting model is applied. This approach is processing intensive and requires custom virtual environments be created in each case of use.

SUMMARY

According to an aspect of some exemplary embodiments, realistic AR augmentations are produced in reliance on a 3D virtual model modeled after a real world environment. Light and shadow parameters for the augmentations are produced not only from real world parameters such as, for example, a real present position of the actual sun, but also from virtual world parameters which characterize the virtual model or virtual objects within the virtual model. This approach advantageously leverages how virtual content is stored and uses the storage technique to improve the authenticity of augmentations sourced from such storage.

DETAILED DESCRIPTION

Figure 1:
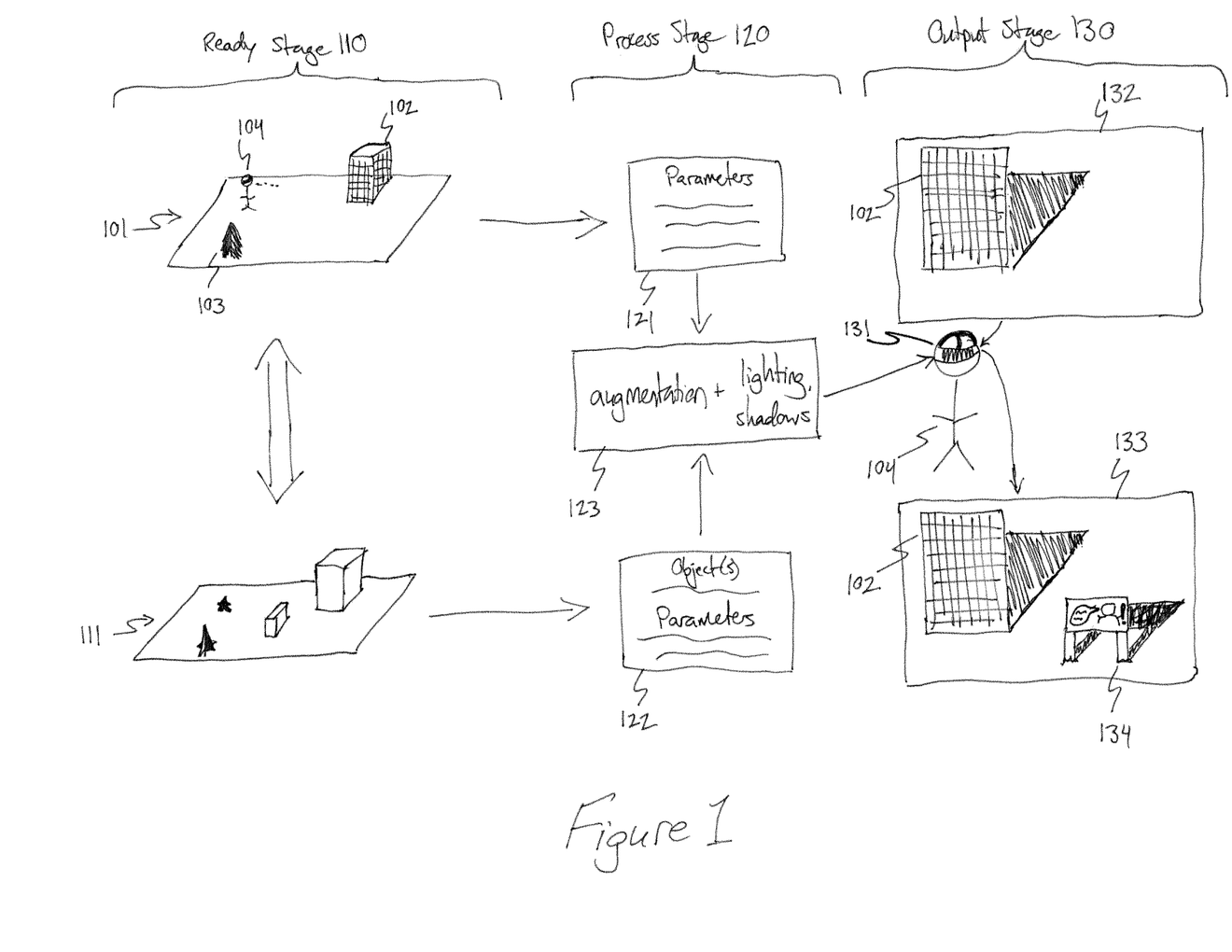
FIG. 1 is a diagram showing relationships among central aspects of an exemplary augmented reality (AR) system.

FIG. 1 illustrates relationships among several central aspects of an exemplary system for realistic augmented reality (AR). By the very context of augmented reality, there will invariably be some real world environment 101 which is to be augmented with virtual content (generally augmentations). The real world environment 101 is an actual place (e.g., on Earth) and characterized by real world aspects. The real world 101 has real physical locations, which depending on the scope or range of the real world under consideration may be bound by certain boundaries or be boundless (e.g., a worldwide model). The real world environment 101 may contain any number of real world objects. In the illustration of FIG. 1, real world objects of the environment 101 include a building 102 and a tree 103. An end user 104 who seeks to experience AR for this environment 101 may be physically present in the environment 101.

"Virtual model" and "virtual world" may be used interchangeably. Since the real world is three-dimensional (3D) to the ordinary perception of humans, a corresponding virtual model may also be characterized as 3D but need not necessarily be so (i.e., a model may be two-dimensional; a model may be four dimensional and include time; a model may be multidimensional with one or more of a plurality of spatial dimensions, a temporal dimension, and other dimensions like color). An exemplary virtual model has virtual locations which are configured to correspond with real world locations. In other words, the virtual model may include a virtual landscape modeled after the real world landscape. Real world geography, locations, landscapes, landmarks, structures, and the like, natural or man-made, may be reproduced within the virtual world in like sizes, proportions, relative positions, and arrangements as in the real world. For example, an exemplary 3D virtual model of New York City would in fact resemble New York City in many respects, with matching general geography and landmarks. Within the virtual world, virtual objects may be created (e.g., instantiated) at virtual locations. Since a virtual location corresponds with a real world location, a virtual object at a given virtual location becomes associated with a particular real world location that corresponds with the given virtual location.

The virtual world containing and storing the virtual objects which are employed for generating AR content may be a 3D virtual representation of the real world which may be stored as data in one or more databases (e.g., a central database or a distributed network). Such databases or networks may store, for example, geometric aspects of the virtual representations and characteristics of the objects which are instantiated within that virtual representation.

The 3D virtual model 111 is configured as a source of one or more virtual objects usable for producing augmentations of an AR output. In some embodiments, the only virtual objects which may be candidates for augmentation may be virtual objects already stored in the 3D virtual model 111. These virtual objects are characterized by having particular spatial relationships with other virtual objects and spaces within the 3D virtual model 111. The virtual objects do not exist in a vacuum, so to speak, untethered from defined spatial geometries or defined spatial relationships with respect to other objects. Moreover the virtual objects may have defined spatial arrangements before any request or signal is sent for producing an AR output for a given user.

Generally, an AR system will perpetually maintain the virtual model 111 in a readiness stage 110. During this stage the virtual model 111 may be modified by various methods. After a signal (or signals) are sent from a user device to the AR system (or AR device depending on the physical configuration of alternative embodiments) to trigger AR content creation and output, the AR system enters a processing stage

120. At this stage the AR system draws upon both the real world environment 101 as well as the corresponding virtual model 111.

A plurality of real world parameters 121 are determined from the real world environment 101. The parameters may be collecting using one or more sensors such as a location sensor (e.g., GPS module), proximity sensor, gyroscope, magnetic compass, and/or other sensors. Some or all of the real world parameters 121 may be capable of influencing lighting conditions. Real world parameters 122 may comprise, for example, time, knowledge of surrounding real world light sources, geolocation, and perceptible ambient lighting at AR content location.

Whereas real world parameters 121 are collected from real world environment 101, a plurality of virtual world parameters 122 are determined from the virtual world 111. It bears repeating that the virtual world 111 from which the virtual parameters are taken is not merely any virtual space which may be used in AR applications generally. Rather, the virtual world 111 is configured to closely correspond with the real world, simulating real world locations as well as real world objects at appropriate locations. The close resemblance and relationship between the real world environment 101 and virtual world 111 has the result that the real world parameters 121 and virtual world parameters 122 may be related, in some cases very closely related. As was the case with the real world parameters 121, the virtual world parameters 122 of interest may be capable of influencing light conditions (though all parameters determined need not necessarily be so). The virtual world parameters 122 may comprise, for example, AR content location within the 3D virtual model.

Among the data sourced from the virtual world 111 is data for one or more virtual objects of the 3D virtual model. The sourced virtual object (or objects) has the virtual content which may be used to create an augmentation that is detectable by the human senses. While virtual objects can but do not necessarily have to take any physically perceptible form, augmentations made from such objects are by definition detectable by one or more sensory modalities (e.g., vision, hearing, touch, taste, or smell).

Having sourced one or more virtual objects, determined one or more virtual world parameters, and determined one or more real world parameters, the AR system proceeds with determining lighting and shadow parameters 123 for the sourced object(s) based on the determined parameters. The resulting parameters may then be supplied to the output device 131 at the output stage 130.

An output device 131 (e.g., an AR device) may start with a completely (i.e., 100%) real view 132 or an existing AR view (i.e., containing both real content and virtual content). The output device 131 uses the information carried over from the process stage 120 to render one or more augmentations 134 in an AR view 133 for the end user's consumption (i.e., perception according to one or more sensory modalities). While visual augmentations like 134 are often the most common augmentation type, in some cases augmentations may additionally or alternatively manifest according to one or more of the other four sensor modalities besides sight.

Figure 2:
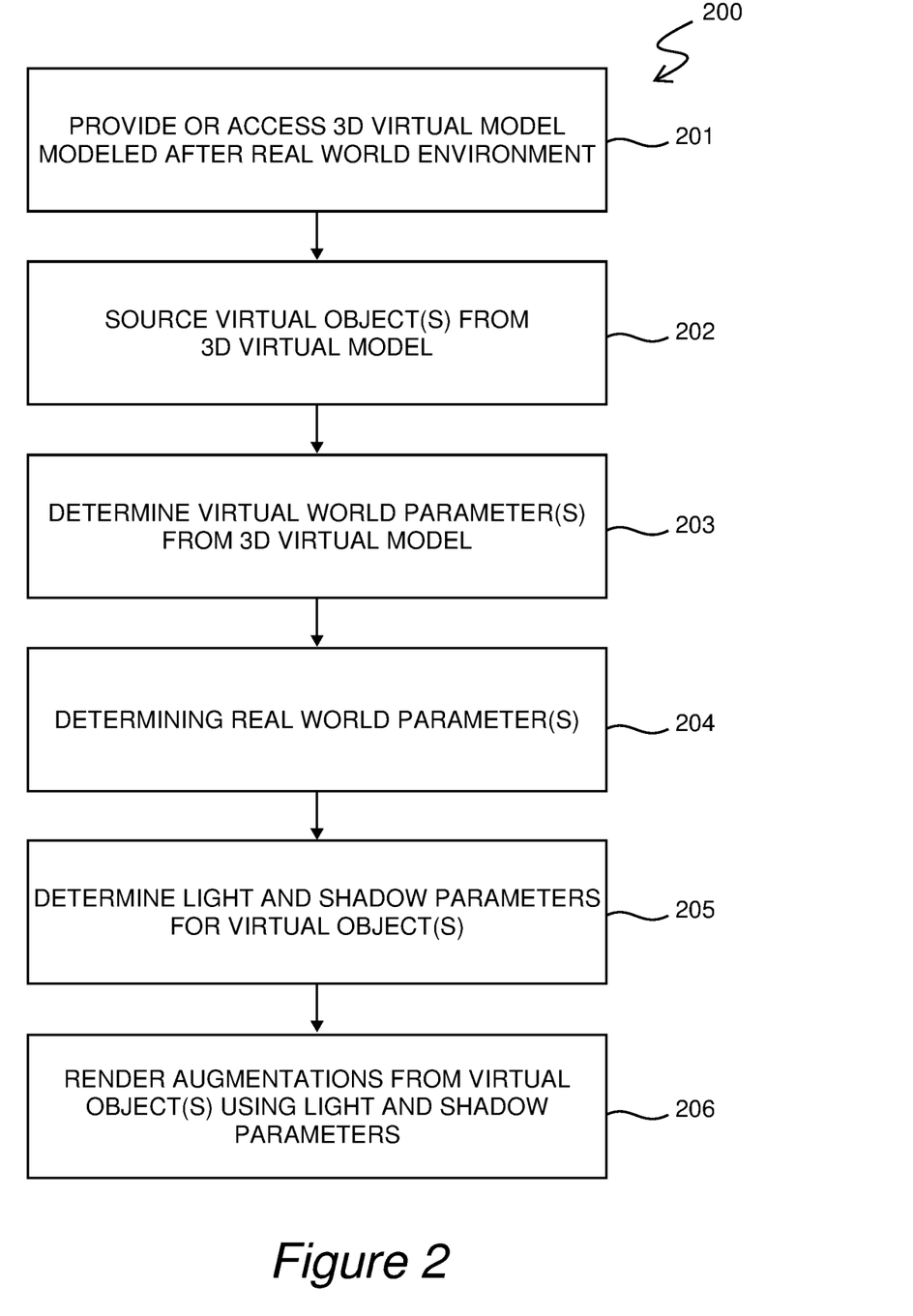
FIG. 2 is an exemplary method for producing realistic AR.

FIG. 2 is a flowchart for a method 200 which generally corresponds with the procedural flow described in connection with the diagram of FIG. 1. The method 200 may generally be regarded as method for (producing) realistic augmented reality. Block 201 is providing or accessing a 3D virtual model that is modeled after a real world environment. Block 202 is sourcing one or more virtual objects from the 3D virtual model, the one or more virtual objects being usable for AR augmentations. Block 203 is determining one or more virtual world parameters capable of influencing lighting conditions, the virtual world parameters deriving from the 3D virtual model. Block 204 is determining a plurality of real world parameters capable of influencing lighting conditions. Block 205 is determining light and shadow parameters for the one or more virtual objects based on the plurality of real world parameters and the one or more virtual world parameters. And finally block 206 is rendering one or more augmentations from the virtual objects using the light and shadow parameters.

Figure 3:
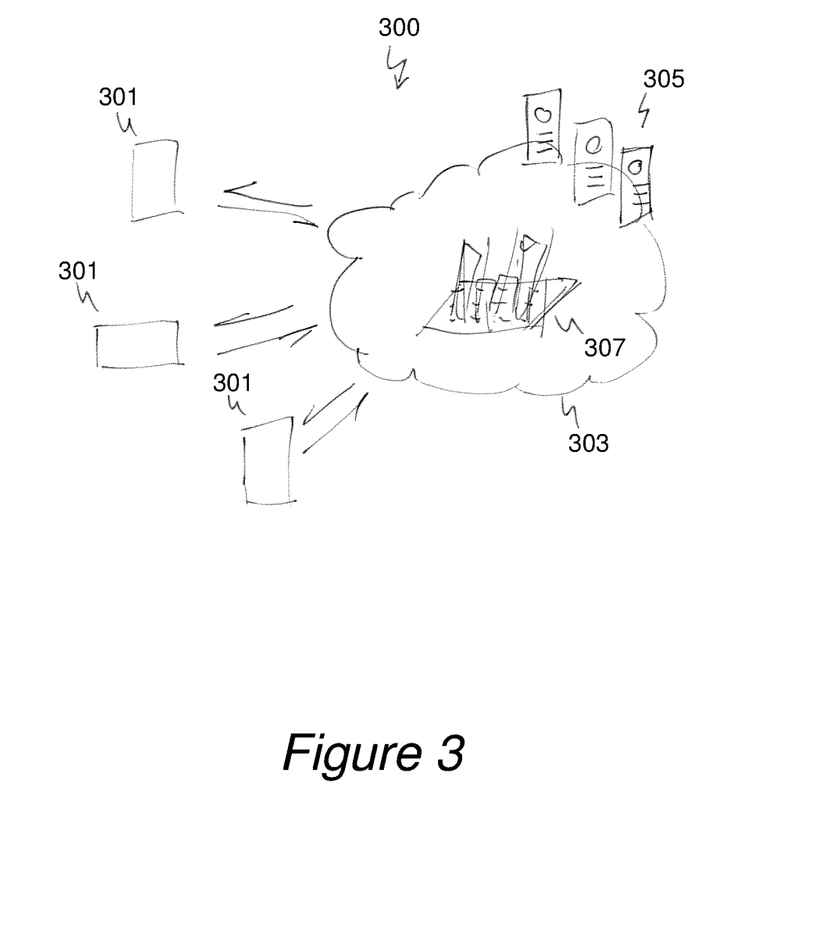
FIG. 3 is an exemplary system for producing realistic AR.

FIG. 3 is a diagram of an exemplary system 300 for augmented reality (AR). FIG. 3 generally serves to illustrate exemplary hardware elements. Some methods disclosed herein are performable by or with a single mobile device 301. Other methods may be suited for use by or with a plurality of devices. The involvement of a plurality of mobile devices 301 may facilitate sharing of AR content among a community of users. One or more networks 303 may be employed for collecting information from the mobile devices (which are often but not necessarily end user devices), sending information to the mobile devices, storing information, and/or processing information. The involvement of multiple devices remote from one another, such as one or more mobile devices 301 and/or one or more servers 305, may facilitate computational load sharing, regulating access content, and providing backup capabilities in the event of a device or system error or failure. One or more cloud-based computers (e.g., servers) 305 may be elements of the system 300 to perform certain cloud-based functions. A networked system 300 may be centralized, or the networked system 300 may be non-centralized (e.g., a peer-to-peer system). One or more virtual models 307 may be stored within the system 300 and used as a backbone for storing, retaining, and retrieving AR content that may be served in AR outputs of mobile devices 301. Data for the virtual model may be stored centrally (e.g., in cloud servers 305) and/or locally on mobile devices 301.

An "augmentation" is a unit of virtual content and may be, for example, a virtual object rendered as a graphic on a display device. An augmentation may comprise or consist of sound, video, graphic, and/or haptic feedback. The term "augmentation" is often used in the context of AR but is not incompatible with use in the context of VR. An augmentation may involve one or more (i.e., at least one) sensory modality. Sensory modalities may be visual, audial, tactile or haptic (e.g., vibration), or olfactoral or gustatory, or any combination thereof, e.g., audiovisual. Augmentations may take the form of, for example, 3D representations of real objects (e.g., a detailed 3D representation of a cell tower), or of abstractions of real objects (e.g., a cell tower represented as a simple cylinder with a sphere at the top), or of indicators or cues (e.g., callout boxes). Some information represented in an augmentation may have no corresponding real world shape. For example, a wireless network link between two wireless network antennas has no real world visible representation, so any augmented presentation of that connection is necessarily some kind of abstraction (e.g., a geometric shape). On the other hand some information represented in an augmentation may have at least one straightforward augmentation that is minimally abstract, e.g., a 3D graphic of a building that is positioned, shaped and colored to be very much like a corresponding real building.

"Real content" is visual content generally determined from light coming from (e.g., reflected from, transmitted by, or emitted from) real world objects. That which human eyes detect in dependence on sunlight (e.g., sunlight reflected off of the human's surroundings) is a non-limiting example of real content. Artificial light may also contribute to producing real content. Cameras which detect sunlight or artificial light from real world objects to produce images of real surroundings may also be said to produce real content. In such circumstances the cameras function analogously to human eyes, and the visual content produced by the human eye or by the camera is real content.

"Virtual content" is visual content which is not determined from light coming from real world objects. Virtual content is often if not always computer generated. Examples will help differentiate virtual content from real content. If a movie film depicts actors in costumes in essentially the same manner as they would appear on a stage in a theater, the movie film is entirely real content. If the movie film contains computer generated imagery (CGI), the CGI content is virtual content and is not real content. The resulting movie may contain a mixture of real content and virtual content. On the other hand, an animated movie film generally contains no real visual content and therefore may be entirely virtual visual content. Of course an animated film may contain recordings of real voice actors, in which case the audio content may be real content.

Augmented reality may involve defining spatial relationships between virtual objects and real objects, and then making the virtual objects apparent to a user of the augmented reality system in such a way as to combine real and virtual objects in semantic context. For example a visual augmented reality display could use virtual and real objects, and their defined spatial relationships, to generate a combined visual display in the form of a live streaming video (presenting real objects) overlaid with representations of the virtual objects. A spatial relationship between two objects (either or both of which may be virtual or real) may involve one or more of a topological relation, a distance relation, and a directional relation. A topological relation between an object A and an object B may be, for example, A is within B, A is touching B, A is crossing B, A is overlapping B, or A is adjacent to B. Precise spatial relationships between real and virtual objects allow an augmented reality system to generate perceptual experiences in which real and virtual objects are apparently combined seamlessly, e.g. for visual systems the combined presentation is apparently in the correct visual proportions, perspectives, and arrangement. Without correct reckoning of the spatial relationships in such a system, errors in the presentation of the system's output to the user can cause the system to be unusable, e.g. virtual objects appear out of place and therefore are not useful. An example is a virtual visual label that should label one building, but is erroneously shown overlaid onto a different building.

In order to create a visual augmented reality system, in addition to establishing spatial relationships between virtual objects and real objects, the visual perspective into the real world must be matched to the effective visual perspective into the virtual world. Even when the virtual world objects are sized and positioned correctly with respect to their real world counterparts, the determination of which virtual objects are eligible for visual presentation to the user depends on the perspective in the virtual world, which must be matched to the real world perspective of a real world camera in order to take advantage of carefully determined spatial relationships among virtual and real objects. The perspective of a camera may include the position of the camera, the orientation of the camera, and its field of view. One or more of these variables may be used to align a real world view with a virtual world view.

A camera's context and surroundings are also dependent on such variables as the camera's location, the camera's orientation, the camera's pose (i.e., the position and orientation together), and the camera's field of view. In some known AR system, some or all of these variables are ignored entirely, the known systems relying predominantly or entirely on image processing like object recognition algorithms.

As used herein, "time" may refer to a day of the week, a calendar day, a clocktime (e.g., identified by the hour or by hours and minutes per a 12 hour or 24 clock), a general time of day (e.g., morning, afternoon, evening, night), a holiday, a season (e.g., fall, winter, summer, spring), a time zone, a year, a decade, a century, some combination of these, and/or some other commonly understood characterization of time.

One or more processors may conduct processing that determines which augmentations should be added to a specific real world view, and as a corollary what augmentations should not be added to that view. There are multiple aspects of a real world view that may affect such a determination. A first aspect is the relationship between the viewing device (e.g., a camera) and an "object" of interest. The spatial relationship between the two objects may involve one or more of a topological relation, a distance relation, and a directional relation. A topological relation between an object A and an object B may be, for example, A is within B, A is touching B, A is crossing B, A is overlapping B, or A is adjacent to B. Precise spatial relationships between real and virtual objects allow an augmented reality system to generate perceptual experiences in which real and virtual objects are apparently combined seamlessly, e.g. for visual systems the combined presentation is apparently in the correct visual proportions, perspectives, and arrangement. Virtual content that has been combined with real world content in this manner may be characterized as being in semantic context with the real world objects or real world view.

It should be appreciated that augmentations that are or include auditory and tactile elements still involve virtual objects that need to be identified with accurate spatial relationships with respect to real world objects. For example, a VR device that is an HMD may be used to give a guided tour of a real place like New York City. When a user looks at the Empire State Building with the HMD, the device may announce through a speaker "You are looking at the Empire State Building." This announcement is an auditory augmentation corresponding with a virtual object that has a location in the virtual world which matches the location of the actual Empire State Building in the real world. Without a determination of the field of the view of the VR device (more specifically the FOV of its camera or cameras), the device conceivably could announce to a user that the Empire State Building is visible when in fact it is just outside of the actual field of view.

In embodiments of the invention, illustrated and described steps may be configured as a greater or fewer number of steps compared to those which are shown. The exemplary methods shown may also be performed or organized with further substeps.

Virtual objects of a virtual world may be stored and manipulated as data within one or more databases. The virtual objects may have their own existence separate from how they are displayed, visualized, haptically buzzed, or otherwise output by an output device. So, generally speaking, a virtual object has its own characteristics, and then, based on those characteristics and on the real and the virtual environment, an exemplary augmented reality system determines what is presented to the user. If a given virtual object is obscured, then it may not be presented to the user as an augmentation. On the other hand, if the system determines that a given virtual object should be visible to the user given the viewing device's position and orientation in the real world and therefore its position and orientation in the virtual world, an augmentation may be displayed (or otherwise provided).

An augmentation may correspond with a virtual object that has a specific location in a virtual world. The virtual world is characterized by a number of locations which correspond with real locations which appear in an image or frame of the real world. In essence, a virtual world (e.g., a virtual model of the real world) is populated with virtual objects corresponding with either or both seen real world objects and unseen qualities of the real world (e.g., data connection paths between cell towers of a mobile network). A virtual world view is characterizable with a frustum. A frustum includes position, orientation, filed of view, and near and far limits of the field of view. A real world view is similarly characterizable, except that in a real world view there is technically no hard limit on near and far limits of field of view.

As a concrete example, an image of a real world view (i.e., a real world image) may include within its field of view a building with a typical rectangular shape. The building has a particular GPS location. More specifically, each of the four corners of the building that touch the ground has its own GPS coordinates. In a corresponding virtual world, a virtual object in the form of a rectangular prism may exist at coordinates which align with the real world GPS coordinates. The virtual object (in this case the rectangular prism) if displayed in an augmented reality would align with the real building in any augmented view so that the two objects—the real world object and the virtual object, align, one superimposed on the other.

Some augmentations are or include a solid 3D model rendered within the context of the real world image. Some augmentations are subject to be changed or replaced or substituted entirely over time. Some augmentations are animations superimposed on the real world image. For example, an augmentation may be a scaled 3D model or animation that is played based on some event. Animations may be triggered (e.g., macroed) based on such an event.

An exemplary system may comprise at least one camera, one or more AR-enabled output devices, and one or more processors configured to execute computer-readable program instructions which, when executed by the processors, cause the processors to perform steps such as those of methods discussed herein. Cameras may be standalone devices or components within multifunction devices which are image capture enabled (e.g., smartphones, tablets, computers, etc.). Elements may be components to the same device or physically independent of one another.

Images/videos captured at some time in the past, previously modified or augmented images/videos, virtual worlds, and/or virtual objects thereof may be stored in individual AR devices and/or in remote databases and/or according to a distributed network of storage resources (e.g., peer-to-peer systems).

AR and VR devices and AR-enabled and VR-enabled devices may take a variety of forms with varying amounts of hardware versus software. Some commercial examples are Microsoft HoloLens, Sony SmartEyeglass, Google Glass, and Vuzix M100 Smart Glasses. Some AR devices may be embodied as virtual reality (VR) headsets. Commercially available examples include Oculus Rift, HTC Vive, and Sony PlayStation VR (Project Morpheus). In the case of VR headsets, AR may be produced by displaying a real world camera's feed to a user as the base image. AR engines may be embodied simply in software. For instance, the software which supports Microsoft HoloLens may be characterized as an AR engine, independent of the physical headset a user must wear to experience the output of the AR engine. Electronic devices like smartphones, personal computers, and servers (both general purpose as well as special purpose) may also be configured as AR engines.

In some embodiments, an exemplary input device comprises, at a minimum, means for capturing information about real world surroundings. Generally the means for capturing information is an optical device, more specifically a camera. The type and number of cameras may vary among embodiments, including visible-light sensitive cameras and night vision (infrared) cameras, among others. Other data besides visual data may be collected to describe real world surroundings. For instance, embodiments may comprise additional sensors such as but not limited to any combination of the some or all of the following: accelerometer(s), location sensor(s) (e.g., GPS modules), gyroscope(s), magnetic field sensor(s) or magnetometer(s), proximity sensor(s), barometer(s), thermometer(s), and microphone(s). The sensors collect the type of data of their respective types (e.g., magnetometer collects magnetic field data or compass data, microphone collects audio data, etc.).

Exemplary processes are generally carried out by some combination of hardware, software, and firmware, either in a particular electronics device or by a system of electronic devices.

An "output device", as used herein, may be a device capable of providing at least visual, audio, audiovisual, or tactile output to a user such that the user can perceive the output using his senses (e.g., using her eyes and/or ears). In many embodiments, an output device will comprise at least one display, at least one speaker, or some combination of display(s) and speaker(s). A suitable display (i.e., display device) is a screen of a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally be only the augmentations that are actively shown or output by the device. Visual augmentations are in any case superimposed on the direct view of the real world environment, without necessarily involving the display of any of the original video input to the system. In fact, for systems which do not use the video input to detect image data, the system may include one or more HMDs that have no camera at all, relying entirely on other sensors (e.g. GPS, gyro, compass) to determine the relevant augmentations, and displaying them on otherwise transparent glasses or visors. Output devices and viewing devices may include or be accompanied by input devices (e.g., buttons, touchscreens, menus, keyboards, data ports, etc.) for receiving user inputs.

A virtual object stored in, with, or with reference to a virtual model may not inherently take a particular state as far as sensory modalities are concerned. For example, a virtual object may not have a particular appearance. Indeed, a virtual object may have no appearance at all, and in essence be "invisible" to an unaided human eye. By contrast, an augmentation is by definition perceptible according to one or more sensory modalities. That is, an augmentation may be seen, heard, touched, smelled, and/or tasted. An augmentation may be regarded as the "face" of a virtual object, in which case data stored in, by, or with the virtual object is used to determine what the augmentation portrays or signifies to a user looking upon that "face".

"User," as used herein, may be an entity which employs a method, device, or system of the invention. A user may be a human, multiple humans, or some other entity. A user may be, for example, a person intended to consume AR content generated in accordance with a method or variant of a method disclosed herein.

"User" may be an entity that uses a part or a whole of the invention. "End user" herein is generally a subset of "user" and implies the entity actually consumes some output of an embodiment, such as an augmented reality output. Often consumption comprises viewing, but it may also or alternatively involve hearing, feeling, tasting, or smelling (the latter two being uncommon forms of consuming AR at the time of the invention but within the scope of possible AR consumption contemplated by the invention). "User" may refer to a human interacting with or using an embodiment of the invention. A user may be a group or classification of multiple users. A user or users may be characterized according to any of a number of characteristics. For example, a user may be characterized by a classification, a type, an age, an access level, a demographic, a status, a customer status, a profession, or some other quality. A user may be a person, a thing, a computer, a software program, an artificial intelligence, a work group, a company, a corporate division, a maintenance crew, a content creator (e.g., a user that captures real world content, or a user that creates virtual content), a content consumer, a content editor, a programmer, a subscriber, and/or some other entity. The expression "per user basis" may be used in reference to any such user listed here or some other user not listed here but meeting the definition of "user" herein provided.

"Perspective" as used herein may refer to one or more of location, orientation, pose, position, and field of view. If the image or video is a composite from multiple cameras, information for each of the cameras or a representative camera may be used. Exemplary perspective information includes a location and an orientation. Thus, at minimum, this would describe the camera's view with respect to the location from which the image or video is taken and a direction in which the camera was facing to capture the real world content contained in the image or video.

"Position" and "location" are similar terms and may sometimes (but not necessarily always) be used interchangeably in the art. "Location" is especially prevalent when used in the context of geography or a system of reference used for describing geography (e.g., GPS). "Position" is more common in the context of coordinate systems generally, especially those which are fairly independent of geography (e.g., the Cartesian coordinate system). Both "position" and "location" may be expressed as a point. Unlike "position" however, "location" may be expressed as a region, space, or area. For example, a street corner may be a location, or an entire town may be a location.

"Location" and "position" may be used to refer to a place where something is, e.g., in a Cartesian coordinate system (or some other coordinate system). As compared with orientation, location may be characterized as linear position whilst orientation may be characterized as rotational position. Location information may be absolute (e.g., latitude, longitude, elevation, and a geodetic datum together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location or position involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location or position information may use any suitable geodetic datum, WGS84 or alternatives thereto.

"Orientation" may be a rotational position (whereas location may be a linear position). Orientation may also be referred to interchangeably as attitude. Even when constrained to a single location, an object may physically take any of a variety of orientations unless further constraints are in place. Orientation may be expressed according to a direction (e.g., a unit vector). Location and orientation together may describe an object according to the six degrees of freedom in three dimensional space.

"Pose" is a term which may be used to refer to position and orientation in the collective.

Field of view (FOV) is the extent of the observable world seen at a given moment, e.g., by a person or by a camera. In photography, the term angle of view (AOV) is more common but can be used interchangeably with the term field of view (FOV).

Angle of view is one significant camera configuration. A camera is only able to capture an image or video (e.g., a series of images) containing an object if that object is within the angle of view of the camera. Because camera lenses are typically round, the angle of view of a lens can typically be expressed as a single angle measure which will be same regardless of whether the angle is measured horizontally, vertically, or diagonally. Angle of view of a camera, however, is also limited by the sensor which crops the image transmitted by the lens. The angle of view of a camera may be given horizontally, vertically, and/or diagonally. If only a single value is given with respect to a camera's FOV, it may refer to a horizontal angle of view.

In some embodiments, one or more processors (e.g., of the device or system that includes the initial camera, or of an AR engine or AR-enabled device) are configured to use some combination of some or all of the following to determine which virtual objects should be provided (e.g., shown or otherwise output) as augmentations: digital compass input from a magnetic sensor; rotational data from a gyroscopic sensor; acceleration data from linear acceleration sensors; GPS data (latitude, longitude, altitude, and geodetic datum) from a GPS sensor; or image data from a video stream (which may itself include augmentations from other AR systems). The processing of this information is used to determine the real world viewing device's (e.g., camera's) position, orientation, and field of view (expressed as a frustum), and to estimate an accuracy of that determination. For example, the one or more processors may determine a viewing device's (e.g., camera's) six-dimensional location. Location may be the set of latitude, longitude, altitude, geodetic datum, and orientation, or include some combination of these. Orientation may be determined as a combination of angles, such as a horizontal angle and a vertical angle. Alternatively, orientation may be determined according to rotations, such as pitch, roll, and yaw.

GPS data along with digital compass and gyroscopic sensor data may be used at a given moment to determine the 3D location and orientation of a camera that is co-located with the relevant sensors. The resulting real world frustum may then be applied to a 3D virtual representation (a virtual world). Corrective algorithms may be used during or after the applying step 323. For instance, if a putative augmentation is not be exactly positioned on or adjacent to an object which appears in the real world content, a procedure may be executed which "snaps" the augmentation to the nearest object detected in the image.

Some embodiments of the present invention may be a system, a device, a method, and/or a computer program product. A system, device, or computer program product may include a computer readable storage medium (or media) having computer readable program instructions thereon for causing a processor to carry out aspects of the present invention, e.g., processes or parts of processes or a combination of processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Processes described herein, or steps thereof, may be embodied in computer readable program instructions which may be paired with or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions and in various combinations.

These computer readable program instructions may be provided to one or more processors of one or more general purpose computers, special purpose computers, or other programmable data processing apparatuses to produce a machine or system, such that the instructions, which execute via the processor(s) of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A method for realistic augmented reality (AR), comprising
    maintaining a 3D virtual model on one or more cloud servers prior to a request from an end user device for AR content creation and output, the 3D virtual model comprising virtual content, wherein the virtual content is content which is not determined from light coming from real world objects, wherein the 3D virtual model is modeled after a real world environment;
    in the one or more cloud servers, determining one or more virtual world parameters capable of influencing lighting conditions, the virtual world parameters deriving from the 3D virtual model;
    in the one or more cloud servers, determining real world parameters capable of influencing lighting conditions based on information collected from a plurality of devices and sent to the one or more cloud servers over one or more networks, wherein the real world parameters include time, geolocation, and real world light sources known to be light sources without detection of light emitted from the real world light sources, wherein the real world light sources include more than one real world light source;
    in the one or more cloud servers, determining lighting and shadow parameters for the one or more virtual objects based on the real world parameters and the one or more virtual world parameters;
    sending a request from the mobile end user device to the one or more cloud servers to access the 3D virtual model which is maintained prior to the request, the mobile end user device being separate and remote from the one or more cloud servers, the mobile end user device being physically present in the real world environment after which the 3D virtual model is modeled;
    with the mobile end user device, sourcing one or more virtual objects from the 3D virtual model, the one or more virtual objects being usable for AR augmentations, wherein the AR augmentations are units of the virtual content; and
    displaying with the mobile end user device one or more of the AR augmentations from the virtual objects using the lighting and shadow parameters.

2. The method of claim 1, wherein at least some of the virtual world parameters determined in the first determining step are selected from the group consisting of AR content location within the 3D virtual model.

3. The method of claim 2, wherein the real world parameters determined in the second determining step further include perceptible ambient lighting at AR content location.

4. The method of claim 1, wherein the 3D virtual model comprises a plurality of virtual objects each having particular spatial relationships with other virtual objects within the 3D virtual model.

5. The method of claim 1, wherein the 3D virtual model models at least a real world city.

6. An augmented reality (AR) device comprising one or more processors and a computer readable storage medium comprising instructions which, when executed by the one or more processors, cause the one or more processors to perform
    maintaining a 3D virtual model on one or more cloud servers prior to a request from an end user device for AR content creation and output, the 3D virtual model comprising virtual content, wherein the virtual content is content which is not determined from light coming from real world objects, wherein the 3D virtual model is modeled after a real world environment;
    in the one or more cloud servers, determining one or more virtual world parameters capable of influencing lighting conditions, the virtual world parameters deriving from the 3D virtual model;
    in the one or more cloud servers, determining real world parameters capable of influencing lighting conditions based on information collected from a plurality of devices and sent to the one or more cloud servers over one or more networks, wherein the real world parameters include time, geolocation, and real world light sources known to be light sources without detection of light emitted from the real world light sources, wherein the real world light sources include more than one real world light source;
    in the one or more cloud servers, determining lighting and shadow parameters for the one or more virtual objects based on the real world parameters and the one or more virtual world parameters;
    sending a request from the mobile end user device to the one or more cloud servers to access the 3D virtual model which is maintained prior to the request, the mobile end user device being separate and remote from the one or more cloud servers, the mobile end user device being physically present in the real world environment after which the 3D virtual model is modeled;
    with the mobile end user device, sourcing one or more virtual objects from the 3D virtual model, the one or more virtual objects being usable for AR augmentations, wherein the AR augmentations are units of the virtual content; and
    displaying with the mobile end user device one or more of the AR augmentations from the virtual objects using the lighting and shadow parameters.

7. The AR device of claim 6, wherein at least some of the virtual world parameters determined in the first determining step are selected from the group consisting of AR content location within the 3D virtual model.

8. The AR device of claim 7, wherein the real world parameters determined in the second determining step further include perceptible ambient lighting at AR content location.

9. A computer program product for realistic augmented reality (AR), the computer program product comprising a computer readable storage medium having program instructions embodied therewith, the program instructions executable by one or more processors to cause the one or more processors to perform a method comprising:

maintaining a 3D virtual model on one or more cloud servers prior to a request from an end user device for AR content creation and output, the 3D virtual model comprising virtual content, wherein the virtual content is content which is not determined from light coming from real world objects, wherein the 3D virtual model is modeled after a real world environment;

in the one or more cloud servers, determining one or more virtual world parameters capable of influencing lighting conditions, the virtual world parameters deriving from the 3D virtual model;

in the one or more cloud servers, determining real world parameters capable of influencing lighting conditions based on information collected from a plurality of devices and sent to the one or more cloud servers over one or more networks, wherein the real world parameters include time, geolocation, and real world light sources known to be light sources without detection of light emitted from the real world light sources, wherein the real world light sources include more than one real world light source;

in the one or more cloud servers, determining lighting and shadow parameters for the one or more virtual objects based on the real world parameters and the one or more virtual world parameters;

sending a request from the mobile end user device to the one or more cloud servers to access the 3D virtual model which is maintained prior to the request, the mobile end user device being separate and remote from the one or more cloud servers, the mobile end user device being physically present in the real world environment after which the 3D virtual model is modeled;

with the mobile end user device, sourcing one or more virtual objects from the 3D virtual model, the one or more virtual objects being usable for AR augmentations, wherein the AR augmentations are units of the virtual content; and displaying with the mobile end user device one or more of the AR augmentations from the virtual objects using the lighting and shadow parameters.

10. The computer program product of claim 9, wherein at least some of the virtual world parameters determined in the first determining step are selected from the group consisting of AR content location within the 3D virtual model.

11. The computer program product of claim 10, wherein the real world parameters determined in the second determining step further include perceptible ambient lighting at AR content location.

\* \* \* \* \*